US012787059B2

(12) United States Patent
Chen et al.

(10) Patent No.: US 12,787,059 B2
(45) Date of Patent: Nov. 3, 2026

(54) CHANNEL SENSING FOR DYNAMIC FREQUENCY SELECTION (DFS)-ASSISTED SIGNALS

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 510 days.

(21) Appl. No.: 18/252,665

(22) PCT Filed: Jan. 13, 2021

(86) PCT No.: PCT/CN2021/071382

§ 371 (c)(1),
(2) Date: May 11, 2023

(87) PCT Pub. No.: WO2022/151004

PCT Pub. Date: Jul. 21, 2022

(65) Prior Publication Data

US 2023/0309143 A1 Sep. 28, 2023

(51) Int. Cl.
*H04W 74/0808* (2024.01)

(52) U.S. Cl.
CPC ................................ *H04W 74/0808* (2013.01)

(58) Field of Classification Search
CPC ................................................ H04W 74/0808

(Continued)

(56) References Cited

U.S. PATENT DOCUMENTS

2008/0056200 A1 3/2008 Johnson
2008/0089279 A1* 4/2008 Hu ........................ H04W 16/14
370/329

(Continued)

FOREIGN PATENT DOCUMENTS

CN 101247635 A 8/2008
CN 110830134 A 2/2020

OTHER PUBLICATIONS

International Search Report and Written Opinion—PCT/CN2021/071382—ISA/EPO—Oct. 14, 2021.

(Continued)

*Primary Examiner* — Asad M Nawaz
*Assistant Examiner* — Hugh Mark Ashley
(74) *Attorney, Agent, or Firm* — Harrity & Harrity, LLP\Qualcomm

(57) ABSTRACT

Various aspects of the present disclosure generally relate to wireless communication. In some aspects, a first base station may sense a channel based at least in part on a sensing time period. The first base station may receive, from a user equipment (UE), a dynamic frequency selection (DFS) signal on the channel during the sensing time period. The first base station may determine to refrain from communicating on one or more of a beam associated with the DFS-assisted signal or the channel on which the DFS-assisted signal is received for a defined duration of time, based at least in part on an indication of the one or more of the beam or the channel being added to a non-occupancy list. Numerous other aspects are described.

33 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0345323 | A1* | 11/2016 | Krishnamoorthy .......................... | H04W 72/0453 |
| 2017/0034707 | A1* | 2/2017 | Green ..................... | G01S 7/021 |
| 2017/0041954 | A1 | 2/2017 | Tsai et al. | |
| 2022/0124796 | A1* | 4/2022 | Salem ................... | H04L 5/0051 |

OTHER PUBLICATIONS

Spreadtrum Communications: "Discussion on Channel Access Mechanism for above 52.6GHz," 3GPP TSG RAN WG1#103-e, R1-2008091, e-Meeting, Oct. 26-Nov. 13, 2020, Nov. 13, 2020 (Nov. 13, 2020), the whole document, 3 pages.

* cited by examiner

CHANNEL SENSING FOR DYNAMIC FREQUENCY SELECTION (DFS)-ASSISTED SIGNALS

CROSS-REFERENCE TO RELATED APPLICATION

This Patent Application is a 371 national stage of PCT Application No. PCT/CN2021/071382 filed on Jan. 13, 2021, entitled "CHANNEL SENSING FOR DYNAMIC FREQUENCY SELECTION (DFS)-ASSISTED SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for channel sensing for dynamic frequency selection (DFS)-assisted signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first base station for wireless communication includes a memory and one or more processors operatively coupled to the memory, the one or more processors configured to: sense a channel based at least in part on a sensing time period; receive, from a UE, a DFS-assisted signal on the channel during the sensing time period; and determine to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

In some aspects, a method of wireless communication performed by a first base station includes sensing a channel based at least in part on a sensing time period; receiving, from a UE, a DFS-assisted signal on the channel during the sensing time period; and determining to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

In some aspects, a non-transitory computer-readable medium storing a set of instructions for wireless communication includes one or more instructions that, when executed by one or more processors of a first base station, cause the first base station to: sense a channel based at least in part on a sensing time period; receive, from a UE, a DFS-assisted signal on the channel during the sensing time period; and determine to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

In some aspects, an apparatus for wireless communication includes means for sensing a channel based at least in part on a sensing time period; means for receiving, from a UE, a DFS-assisted signal on the channel during the sensing time period; and means for determining to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
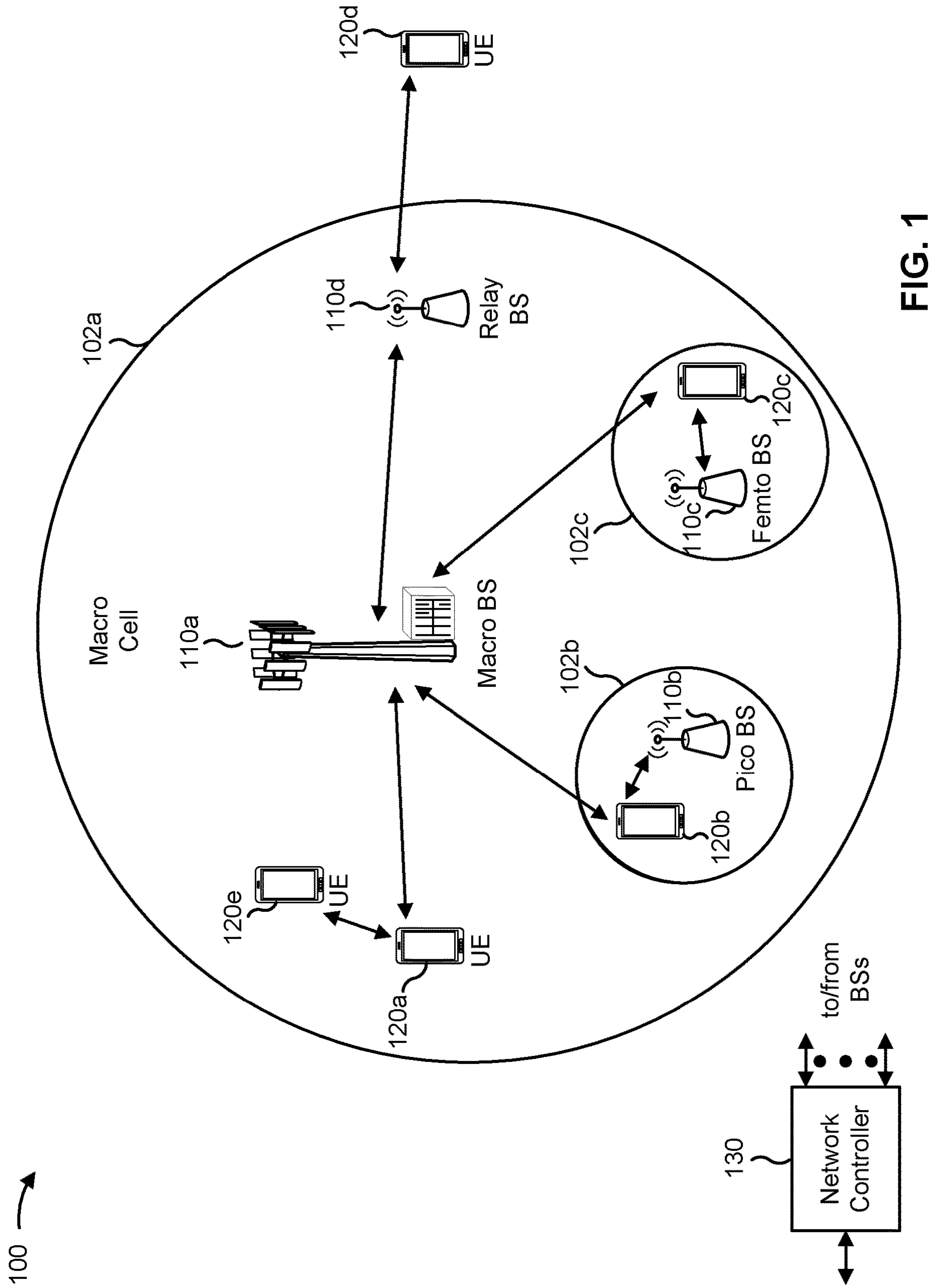
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
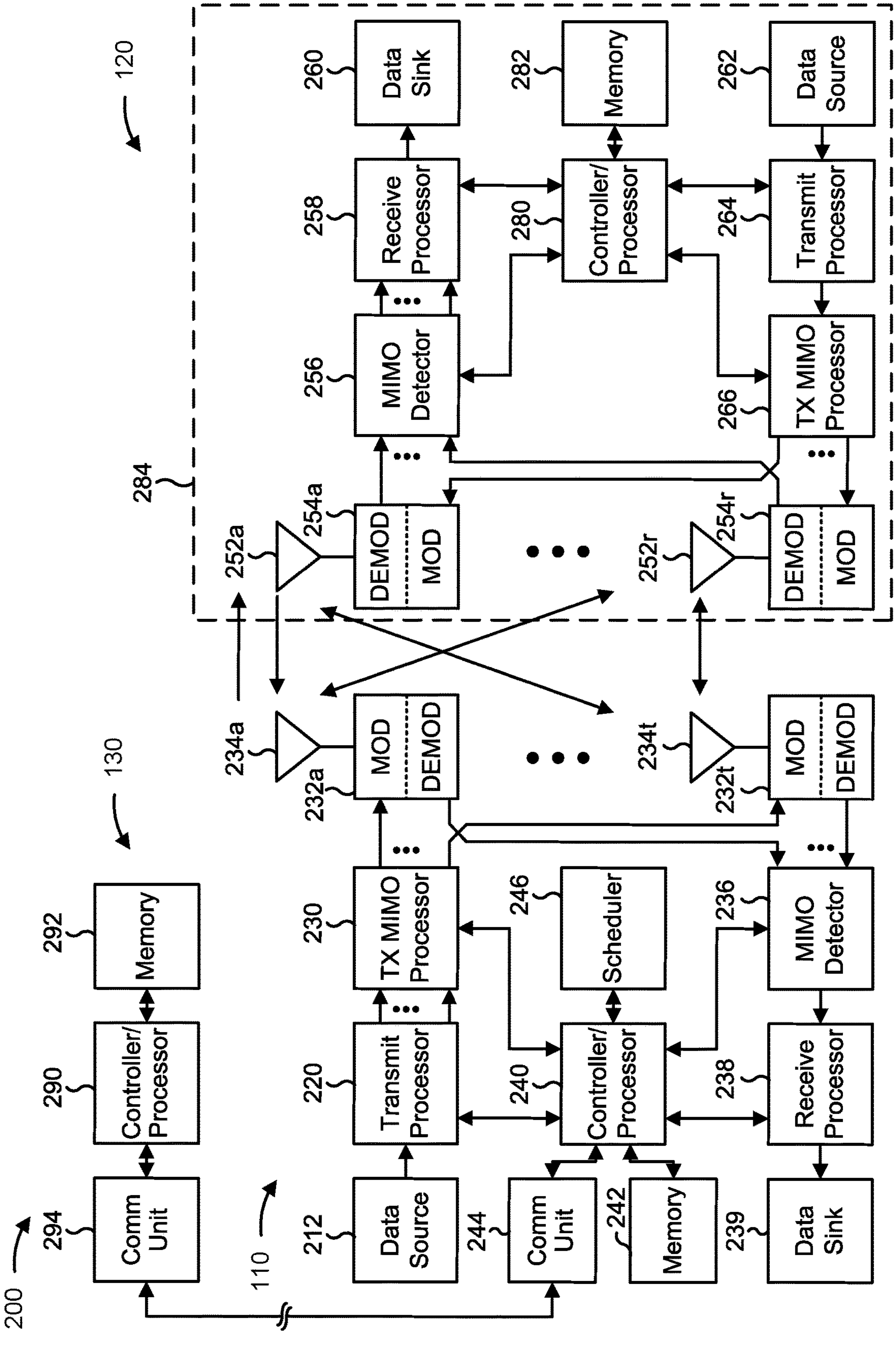
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10.

Controller/processor 240 of base station 110, controller/processor 280 of UE 120, and/or any other component(s) of FIG. 2 may perform one or more techniques associated with channel sensing for DFS-assisted signals, as described in more detail elsewhere herein. For example, controller/processor 240 of base station 110, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some aspects, executing instructions may include running the instructions, converting the instructions, compiling the instructions, and/or interpreting the instructions, among other examples.

In some aspects, a first base station (e.g., base station 110) includes means for sensing a channel based at least in part on a sensing time period; means for receiving, from a UE, a DFS-assisted signal on the channel during the sensing time period; and/or means for determining to refrain from communicating on one or more of a beam associated with the DFS-assisted signal or the channel on which the DFS-assisted signal is received for a defined duration of time, based at least in part on an indication of the one or more of the beam or the channel being added to a non-occupancy list. The means for the first base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the first base station includes means for receiving an indication of the predefined channel sensing pattern from a second base station that is neighboring the first base station.

In some aspects, the first base station includes means for determining to not sense the channel outside the sensing time period based at least in part on the predefined channel sensing pattern.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

DFS is a spectrum-sharing mechanism that allows wireless local area networks (WLANs) to coexist with radar systems. DFS may automatically select a frequency that does not interfere with certain radar systems while operating in a 5 GHz band. DFS may detect radar interference and move a wireless network to another frequency with no interference. DFS may maintain a list of channels in which radar has been detected in a non-occupancy list.

An access point (AP) may avoid using a channel indicated on the non-occupancy list for a period of time (e.g., at least 30 minutes) after the radar has been detected on the channel. Further, when DFS is enabled, the AP may secure a frequency channel based at least in part on a lack of radar detection, as well as continuously scan for radar signal patterns during operation.

Figure 3:
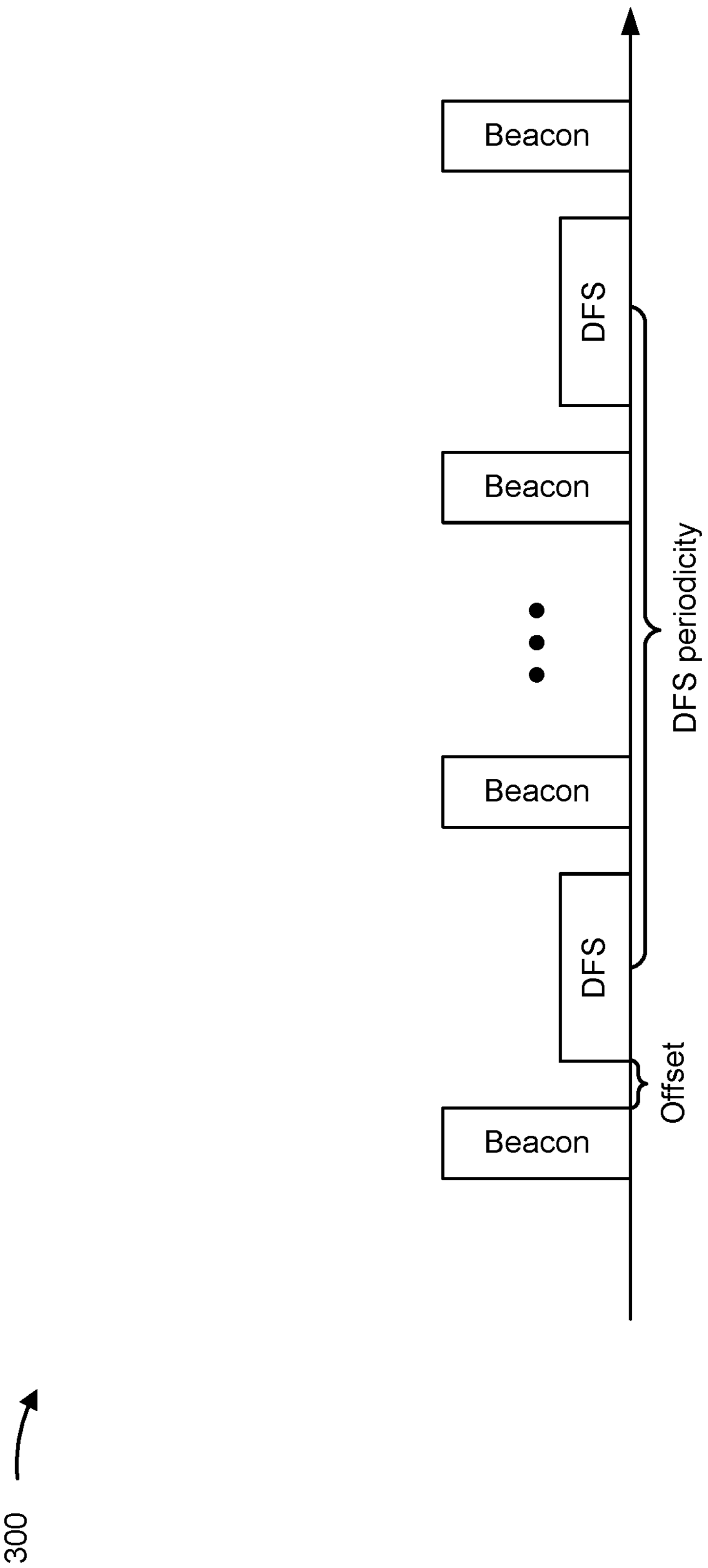
FIG. 3 is a diagram illustrating an example of a DFS periodicity, in accordance with various aspects of the present disclosure.

FIG. 3 is a diagram illustrating an example 300 of a DFS periodicity, in accordance with various aspects of the present disclosure.

As shown in FIG. 3, a beacon may be transmitted by a transmitter. The beacon may be followed by an offset, after which a DFS period may occur. The DFS period may be associated with a quantity of time. The DFS period may also be associated with a DFS periodicity. In other words, a first DFS period may be followed by a second DFS period in accordance with the DFS periodicity.

DFS may be associated with various parameters, such as a non-occupancy period, a channel available check, a channel availability check time, and/or a channel move time. “Non-occupancy period” may refer to a time during which a channel may not be utilized after a radar waveform is detected on that channel. The non-occupancy period may, for example, be a minimum of 30 minutes. The channel available check may be a DFS function that monitors a channel to determine whether a radar waveform satisfies a DFS detection threshold. For example, the channel available check may monitor the channel to determine if the radar waveform above the DFS detection threshold is present. The channel availability check time may be a period of time during which a channel availability check is performed. The channel availability check time may be, for example, 60 seconds. The channel move time may be a time to cease transmissions (e.g., all transmissions) on a current channel after detection of a radar waveform that satisfies the DFS detection threshold. For example, the transmissions on the current channel may be ceased after detecting the radar waveform to be above the DFS detection threshold. The channel move time may be, for example, 10 seconds.

As indicated above, FIG. 3 is provided as an example. Other examples may differ from what is described with regard to FIG. 3.

In a millimeter wave (mmWave) system, due to directional beamforming, an interference collision probability may be lower as compared to a sub 7 GHz band. A higher transmit and receive directionality may reduce a need for listen-before-talk (LBT), and as a result, LBT is not mandated by regulations in mmWave New Radio Unlicensed (NR-U) in certain regions. While the interference collision probability in the mmWave system may be relatively low, any interference collisions may result in a performance loss. Interference mitigation in a long-term time frame and/or a short-term time frame may be implemented in order to avoid interference collisions.

DFS may be extended to the mmWave system. In this case, DFS may not be employed in the mmWave system to detect radar systems, but rather to detect other devices/networks deployed in a neighboring area.

When employing DFS only at a transmitter and not at a receiver, channel sensing issues (e.g., channel sensing deafness) may result, due to directional transmit and receive beamforming. The channel sensing issues may involve a hidden node issue, in which the transmitter may be unable to detect interference at the receiver. Further, the channel sensing issues may involve an exposed node issue, in which the transmitter detects tolerable/harmless interference to the receiver. A receive-assisted DFS may be more beneficial than a transmit-only DFS to mitigate the channel sensing issues.

In the mmWave system, interference collisions may cause performance losses. The interference collisions may occur even though highly directional beamforming may be employed in the mmWave system. Interference collisions may result in decreased network speeds and an increase in data retransmissions, thereby wasting power at the UEs.

In various aspects of techniques and apparatuses described herein, a first base station may sense a channel based at least in part on a sensing time period. The first base station may sense the channel based at least in part on a predefined channel sensing pattern, which may be shared with a second base station that is neighboring the first base station. For example, the first base station and the second base station may be associated with neighboring cells. Alternatively, or additionally, the first base station may sense the channel based at least in part on traffic that is received at the first base station. The first base station may receive, from a UE, a DFS-assisted signal on the channel during the sensing time period. The first base station may determine to refrain from communicating on a beam associated with the DFS-assisted signal and/or the channel on which the DFS-assisted signal is received for a defined duration of time, based at least in part on an indication of the beam and/or the channel being added to a non-occupancy list. As a result, DFS may be used to detect other devices/networks deployed in neighboring cells, and may be used to temporarily suspend communications on certain channels by certain base stations, thereby reducing a likelihood of interference collisions on those channels.

Figure 4:
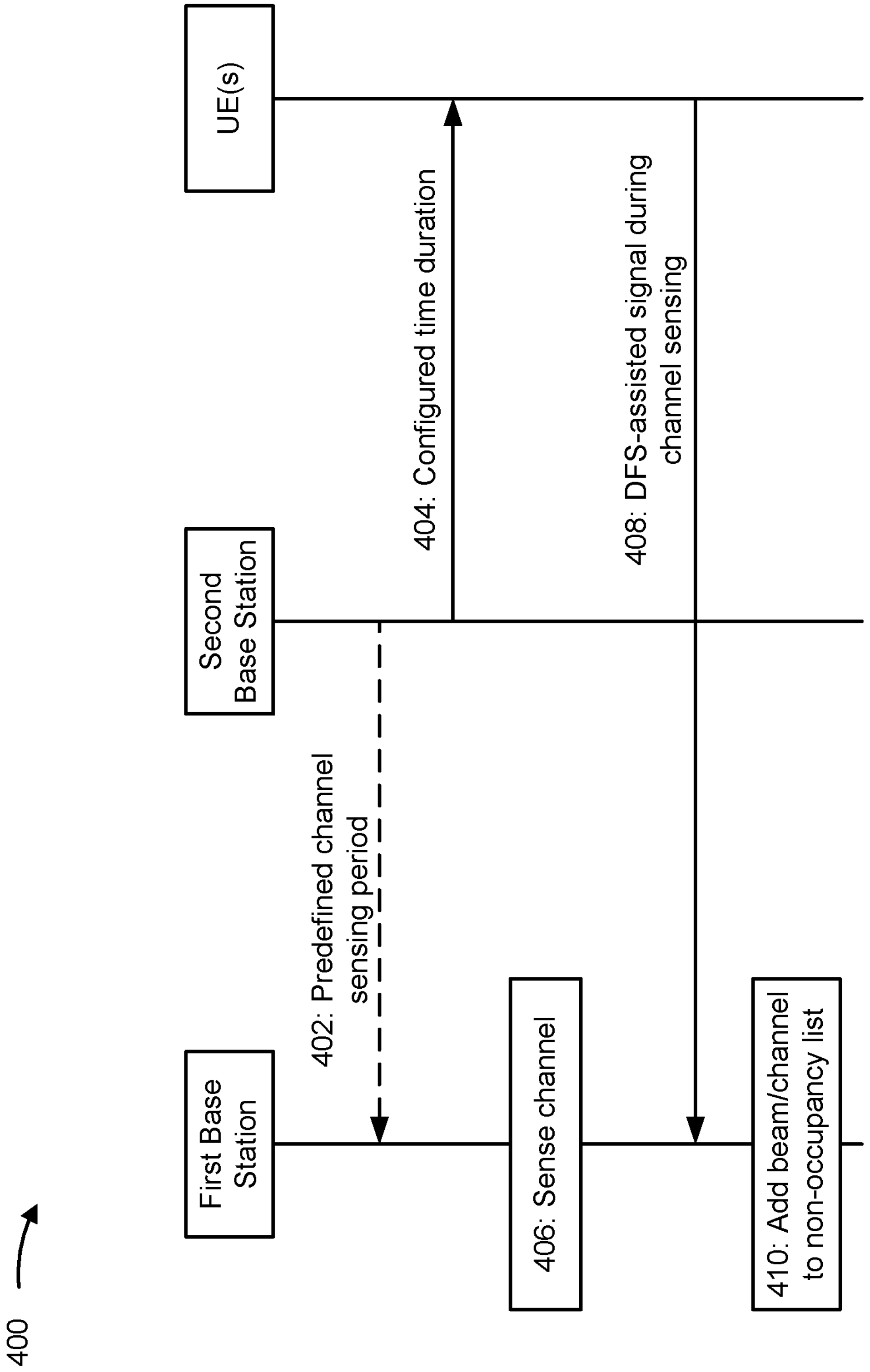
FIGS. 4-9 are diagrams illustrating examples associated with channel sensing for DFS-assisted signals, in accordance with various aspects of the present disclosure.

FIG. 4 is a diagram illustrating an example 400 associated with channel sensing for DFS-assisted signals, in accordance with various aspects of the present disclosure. As shown in FIG. 4, example 400 includes communication between a first base station (e.g., base station 110*a*), a secondary base station (e.g., base station 110*d*), and a UE (e.g., UE 120*d*). In some aspects, the first base station, the second base station, and the UE may be included in a wireless network such as wireless network 100.

In some aspects, the second base station and the first base station may be neighboring base stations. For example, the first base station may be associated with a first cell and the second base station may be associated with a second cell, where the first cell and the second cell may be neighboring cells. The neighboring cells may be overlapping cells, adjacent cells which may include overlapping cells, or non-adjacent cells that are within a threshold distance of each other. The first cell and the second cell may be cells in a network capable of mmWave communications.

As shown by reference number 402, the first base station may receive an indication of a predefined channel sensing pattern from the second base station. The predefined channel sensing pattern may define a periodicity for channel sensing of DFS-assisted signals. In other words, the predefined channel sensing pattern may configure the first base station to sense a channel for DFS-assisted signals in accordance with the periodicity.

In some aspects, in a synchronous DFS system, in the case of multiple deployments sharing a medium, the first base station may store the indication of the predefined channel sensing pattern associated with the second base station, and vice versa. The predefined channel sensing pattern may enable the first and second base stations to detect DFS-assisted signals during certain time periods in accordance with the predefined channel sensing pattern, while not performing channel sensing outside of the certain time periods associated with the predefined channel sensing pattern.

In some aspects, in the synchronous DFS system, the predefined channel sensing pattern may be shared by both the first and second base stations. The predefined channel sensing pattern may refer to periods of time during which the first and second base stations sense a channel to detect DFS-assisted signals. The predefined channel sensing pattern that is shared between the first and second base stations may correlate to channel availability check times shared between the first and second base stations. Synchronization of the predefined channel sensing pattern (or channel availability check times) may increase reliability of channel sensing, and may reduce overhead by reducing a time spent sensing the channel. For example, the channel sensing may be limited to specific time windows.

As an example, the channel sensing for DFS-assisted signals may occur at T0, T0+T1, T0+T2, etc. in accordance with the predefined channel sensing pattern. For example, T1=ΔT, T2=2 ΔT, etc., and may be independent of an intended transmission time.

In some aspects, in an asynchronous DFS system, in the case of multiple deployments sharing the medium, channel sensing may be independent for the first and second base stations. For example, the first base station may not store a predefined channel sensing pattern (or channel availability check time) associated with the second base station, and vice versa. As a result, the first base station (or a first deployment) may be unaware of time periods in which the second base station (or a second deployment) is sensing the channel for DFS-assisted signals. In the asynchronous DFS system, an accuracy of channel sensing may be lower and/or overhead may be increased as compared to the synchronous DFS system.

As an example, the channel sensing for DFS-assisted signals may occur at T0, T0+T1, T0+T2, etc., where T1 and T2 are based at least in part on a base station implementation.

In some aspects, in the asynchronous DFS system, the first base station or the second base station may not perform the channel sensing when no traffic is being received. Rather, after traffic is generated, the first base station or the second base station may determine to sense the channel for DFS-assisted signals.

As shown by reference number 404, the second base station may transmit a configured time duration to the UE. The configured time duration may enable the UE to transmit the DFS-assisted signal during a sensing time period of the first base station. In some aspects, the second base station may configure a duration within the sensing time period (or channel availability check time) associated with the predefined channel sensing pattern for the UE to transmit the DFS-assisted signal. The UE may determine when to transmit the DFS-assisted signal based at least in part on the configured time duration received from the second base station. In some aspects, the second base station may configure a duration after traffic arrives at the UE to transmit the DFS-assisted signal. In some aspects, the configured time duration may be on a per-beam basis or a per-beam-group basis.

In some aspects, the second base station may use the configured time duration to transmit signals in order to protect receive beams associated with the second base station. For example, the second base station may transmit signals based at least in part on the configured time duration to protect receive beams of the second base station used for uplink reception. Other base stations, such as the first base station, in response to receiving the signals from the second base station, may not perform transmissions that conflict with the uplink receive beams of the second base station.

As shown by reference number 406, the first base station may sense the channel for DFS-assisted signals. The first base station may sense the channel based at least in part on the sensing time period. The first base station may perform DFS on the sensing time period, and the DFS-assisted signals may serve to increase a DFS reliability. In some aspects, the first base station may sense the channel for DFS-assisted signals based at least in part on the predefined channel sensing pattern. The first base station may not sense the channel outside the sensing time period based at least in part on the predefined channel sensing pattern. The first base station may sense the channel based at least in part on the predefined channel sensing pattern when operating in the synchronous DFS system. In some aspects, the first base station may sense the channel for DFS-assisted signals for the sensing time period based at least in part on a channel sensing mechanism that is specific to the first base station. For example, the first base station may sense the channel based at least in part on traffic that is received at the first base station. A receipt of traffic may trigger the first base station to sense the channel for the sensing time period. The first base station may sense the channel based at least in part on the receipt of traffic when operating in the asynchronous DFS system, and not based at least in part on a predefined channel sensing pattern that is shared with the second base station.

As shown by reference number 408, the first base station may receive, from the UE, a DFS-assisted signal on the channel during the sensing time period. The first base station may detect the DFS-assisted signal based at least in part on the channel sensing. The first base station may receive the DFS-assisted signal from the UE based at least in part on the configured time duration transmitted by the second base station to the UE. In some aspects, the DFS-assisted signal may be a single frequency network (SFN)-based transmission, which may reduce overhead and improve signal quality.

In some aspects, the first base station may receive the DFS-assisted signal from the UE based at least in part on scheduling information and/or interference information associated with the UE. The second base station may trigger an on-demand DFS-assisted signal transmission from the UE for receiver protection (e.g., UE protection). The second base station may control which UEs to configure for protection based at least in part on upcoming scheduling information, interference observations, etc. In some aspects, the UE may determine to not send DFS-assisted signals, in order to control overhead and/or a UE transmit power, and the UE may skip sending the DFS-assisted signals. The UE may skip sending the DFS-assisted signals based at least in part on a determination by the UE that only minimal interference is observed.

In some aspects, the DFS-assisted signal may be associated with a sequence. The sequence may be based at least in part on a cell identifier. In some aspects, the DFS-assisted signal may be associated with a waveform to assist with energy detection. In other words, the DFS-assisted signal may be a sequence or a waveform to aid the first base station to detect energy during the configured time duration associated with the channel sensing.

In some aspects, the first base station may identify a source of a received DFS-assisted signal, such that the first base station may distinguish the source of UE energy associated with the received DFS-assisted signal. For example, the DFS-assisted signal may be a sequence-based signal, and different sequences may be used, for example, based on the cell identifier. As a result, the first base station may identify a source of energy associated with the DFS-assisted signal based at least in part on the cell identifier associated with the DFS-assisted signal.

In some aspects, the first base station may receive the DFS-assisted signal from the UE based at least in part on a radio resource control (RRC) configuration received at the UE from the second base station. In other words, the second base station may transmit, to the UE, the RRC configuration that indicates an offset associated with a transmission of the DFS-assisted signal and a resource associated with the DFS-assisted signal. The UE may transmit the DFS-assisted signal to the first base station based at least in part on the RRC configuration indicating the offset and the resource received from the second base station. The offset may refer to a transmission start point, and the resource may be used to transmit the DFS-assisted signal. The offset among different UEs may be a same value within a group of UEs.

In some aspects, the first base station may receive the DFS-assisted signal from the UE based at least in part on downlink control information (DCI) received at the UE from the second base station. In other words, the second base station may transmit, to the UE, the DCI that indicates a resource associated with the DFS-assisted signal. The UE may transmit the DFS-assisted signal to the first base station based at least in part on the DCI indicating the resource received from the second base station.

As shown by reference number 410, the first base station may add an indication of a beam and/or the channel associated with the detected DFS-assisted signal to a non-occupancy list. The first base station may not be permitted to perform communications using the beam and/or the channel on the non-occupancy list for a defined duration of time. In other words, the first base station may determine to refrain from communicating on the beam associated with the DFS-assisted signal and/or the channel on which the DFS-assisted signal is received for the defined duration of time, based at least in part on the indication of the beam and/or the channel being added to a non-occupancy list. The beam and/or the channel may be being used by the UE to communicate with the second base station, so the first base station may refrain from communicating using the beam and/or channel to avoid causing interference to the second base station.

In some aspects, the first base station may sense the channel and detect energy associated with the DFS-assisted signal, and the first base station may add the indication of the beam and/or channel to the non-occupancy list. The beam and/or channel indicated in the non-occupancy list may be prohibited from being used by the first base station for a quantity of time. The beam and/or channel may be prohibited from being used for a next X ms, as long as no additional indication is included in the sequence associated with the DFS-assisted signal. As a result, DFS may be used to detect other devices/networks deployed in neighboring cells, and may be used to temporarily suspend communications on certain channels by certain base stations, thereby reducing a likelihood of interference collisions on those channels.

In some aspects, in the synchronous DFS system, the predefined channel sensing pattern may be shared between base stations, whereas in the asynchronous DFS system, channel sensing may be independent between the base stations. In other words, a specific pattern and periodicity for channel sensing may be defined in the synchronous DFS system, which may not occur in the asynchronous DFS system. In the synchronous DFS system, the periodicity of the channel sensing may be larger (e.g., channel sensing may occur less often), as compared to the asynchronous DFS system, due to an improved detection probability in time for the synchronous DFS system. In some aspects, the asynchronous DFS system may be associated with a shorter periodicity for the channel sensing as compared to the synchronous DFS system, although more frequent channel sensing and more frequency DFS transmissions from UEs may increase a channel sensing accuracy in the asynchronous DFS system. In some aspects, an accuracy when sensing DFS-assisted signals may be lower and overhead may be higher in the asynchronous DFS system, as compared to the synchronous DFS system. The synchronous DFS system may be associated with a higher energy threshold and thereby improved DFS-assisted signal detection, as compared to a lower energy threshold associated with the asynchronous DFS system.

As indicated above, FIG. 4 is provided as an example. Other examples may differ from what is described with regard to FIG. 4.

Figure 5:
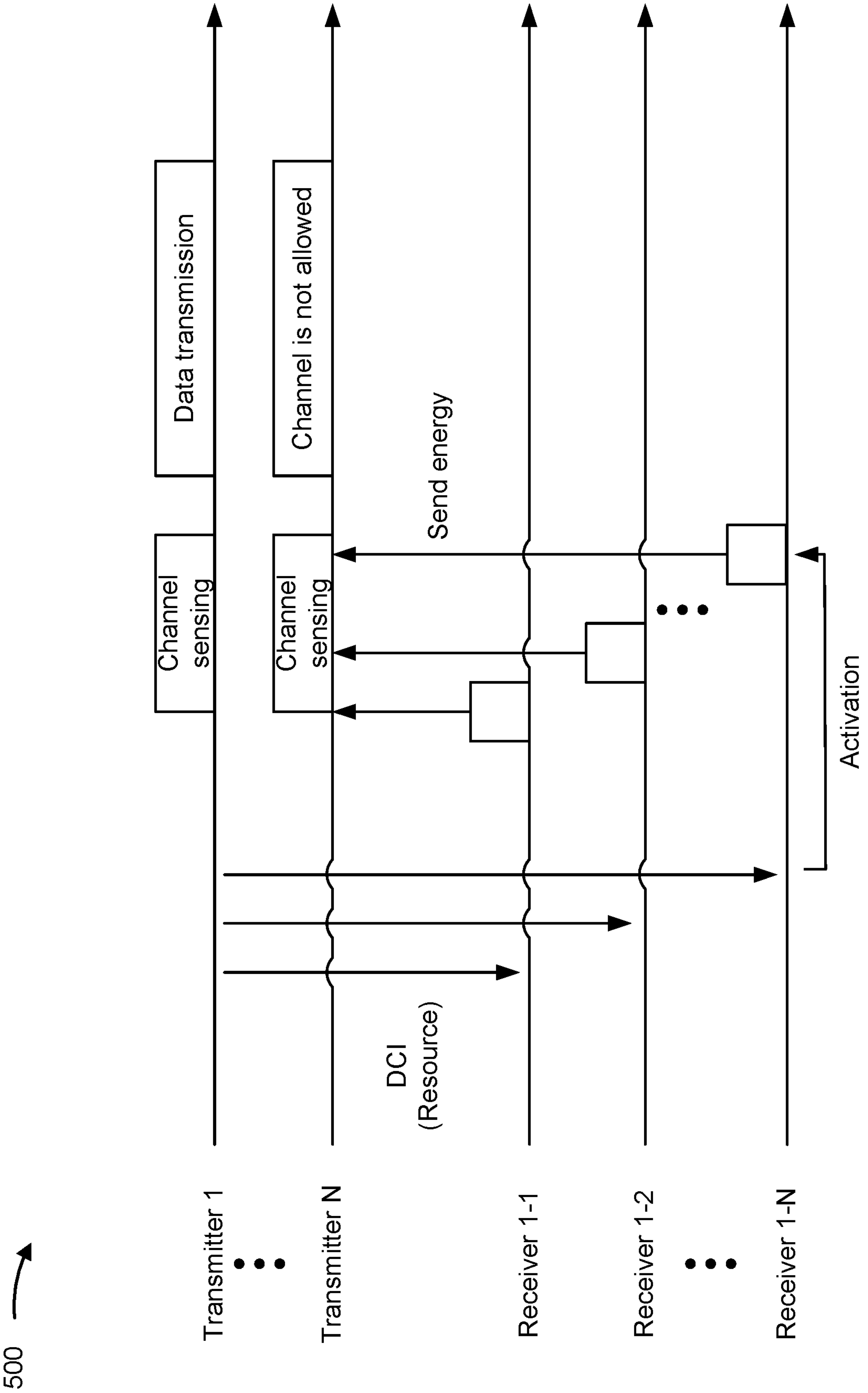

FIG. 5 is a diagram illustrating an example 500 associated with channel sensing for DFS-assisted signals, in accordance with various aspects of the present disclosure.

As shown in FIG. 5, in a synchronous DFS system, a Transmitter 1 may transmit separate downlink control information (DCI) to a Receiver 1-1, a Receiver 1-2, and a Receiver 1-N. Transmitter 1 may be a base station. Receiver 1-1, Receiver 1-2, and Receiver 1-N may be UEs. Receiver 1-1, Receiver 1-2, and Receiver 1-N may separately transmit DFS-assisted signals based at least in part on the separate DCIs received from Transmitter 1. The DFS-assisted signals may be transmitted using resources indicated in the separate DCIs. The DFS-assisted signals may be sequences or energy detection waveforms. A Transmitter N may receive the DFS-assisted signals while Transmitter N is sensing a channel for DFS-assisted signals. Transmitter N may sense the channel based at least in part on an indication of a predefined channel sensing pattern received from Transmitter 1. Transmitter N may add one or more channels or beams associated with the DFS-assisted signals to a non-occupancy list. Transmitter N may not perform communications using the one or more channels or beams for a defined duration of time. Transmitter 1 may continue to perform data transmissions when Transmitter N is not performing communications using the one or more channels or beams for the defined duration of time.

As indicated above, FIG. 5 is provided as an example. Other examples may differ from what is described with regard to FIG. 5.

Figure 6:
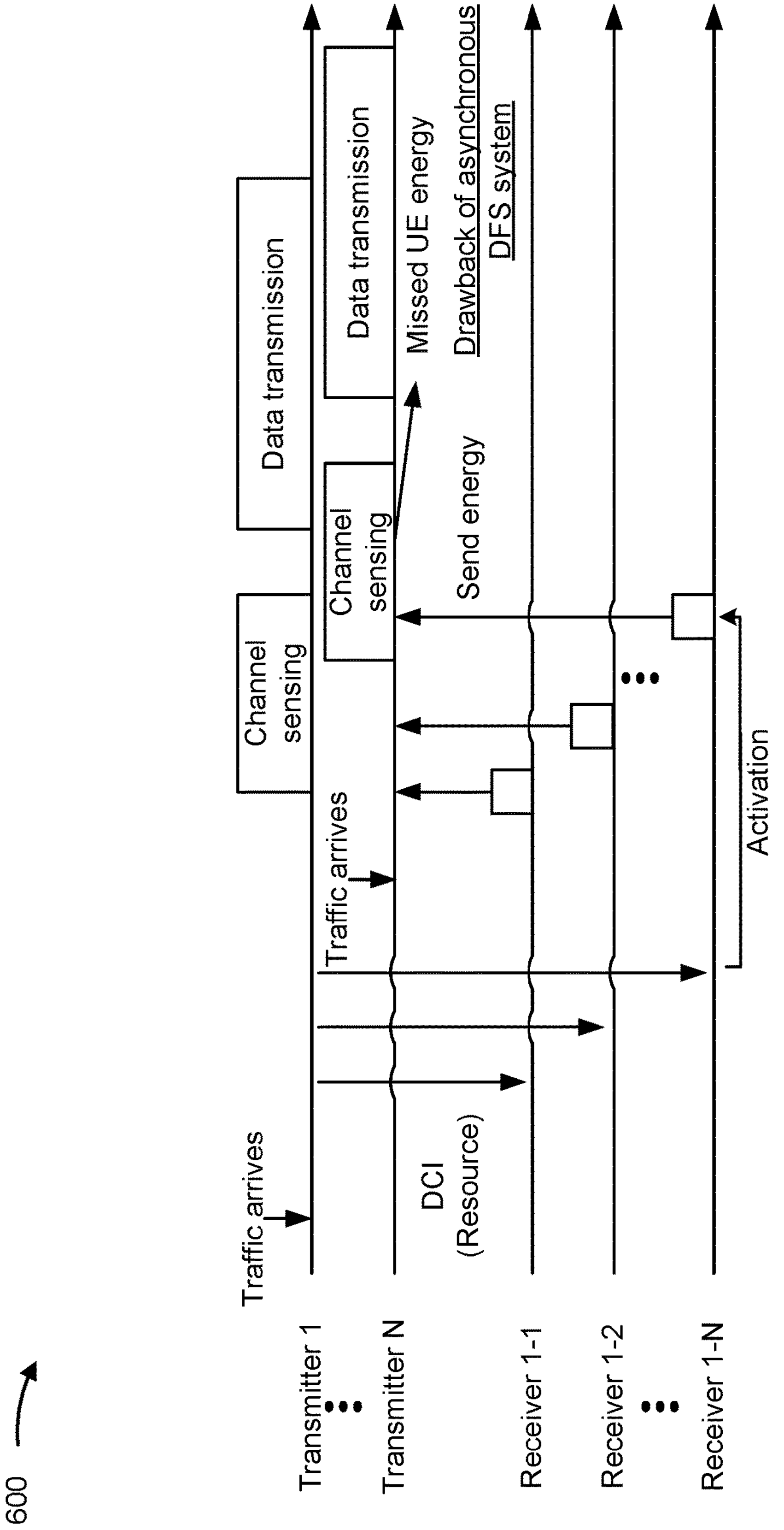

FIG. 6 is a diagram illustrating an example 600 associated with channel sensing for DFS-assisted signals, in accordance with various aspects of the present disclosure.

As shown in FIG. 6, in an asynchronous DFS system, a Transmitter 1 may transmit separate DCIs to a Receiver 1-1, a Receiver 1-2, and a Receiver 1-N. Receiver 1-1, Receiver 1-2, and Receiver 1-N may separately transmit DFS-assisted signals based at least in part on the separate DCIs received from Transmitter 1. The DFS-assisted signals may be sequences or energy detection waveforms. In some cases, a Transmitter N may not detect the DFS-assisted signals transmitted by Receiver 1-1 and Receiver 1-2 when Transmitter N is not sensing a channel when the DFS-assisted signals are transmitted by Receiver 1-1 and Receiver 1-2, but the Transmitter N may detect the DFS-assisted signal transmitted by Receiver 1-N when the Transmitter N is sensing the channel. In the asynchronous DFS system, Transmitter N may not sense the channel in accordance with a predefined channel sensing pattern. Rather, Transmitter N may determine when to sense the channel, such as after traffic is received at Transmitter N. As a result, Transmitter N may sense the channel after the DFS-assisted signals are transmitted, and Transmitter N may not detect the DFS-assisted signals and add one or more channels or beams associated with the DFS-assisted signals to a non-occupancy list. In this example, channel sensing performed at Transmitter N may not result in a detection of DFS-assisted signals, so Transmitter N may continue to perform data transmissions after the channel sensing is finished.

As indicated above, FIG. 6 is provided as an example. Other examples may differ from what is described with regard to FIG. 6.

Figure 7:
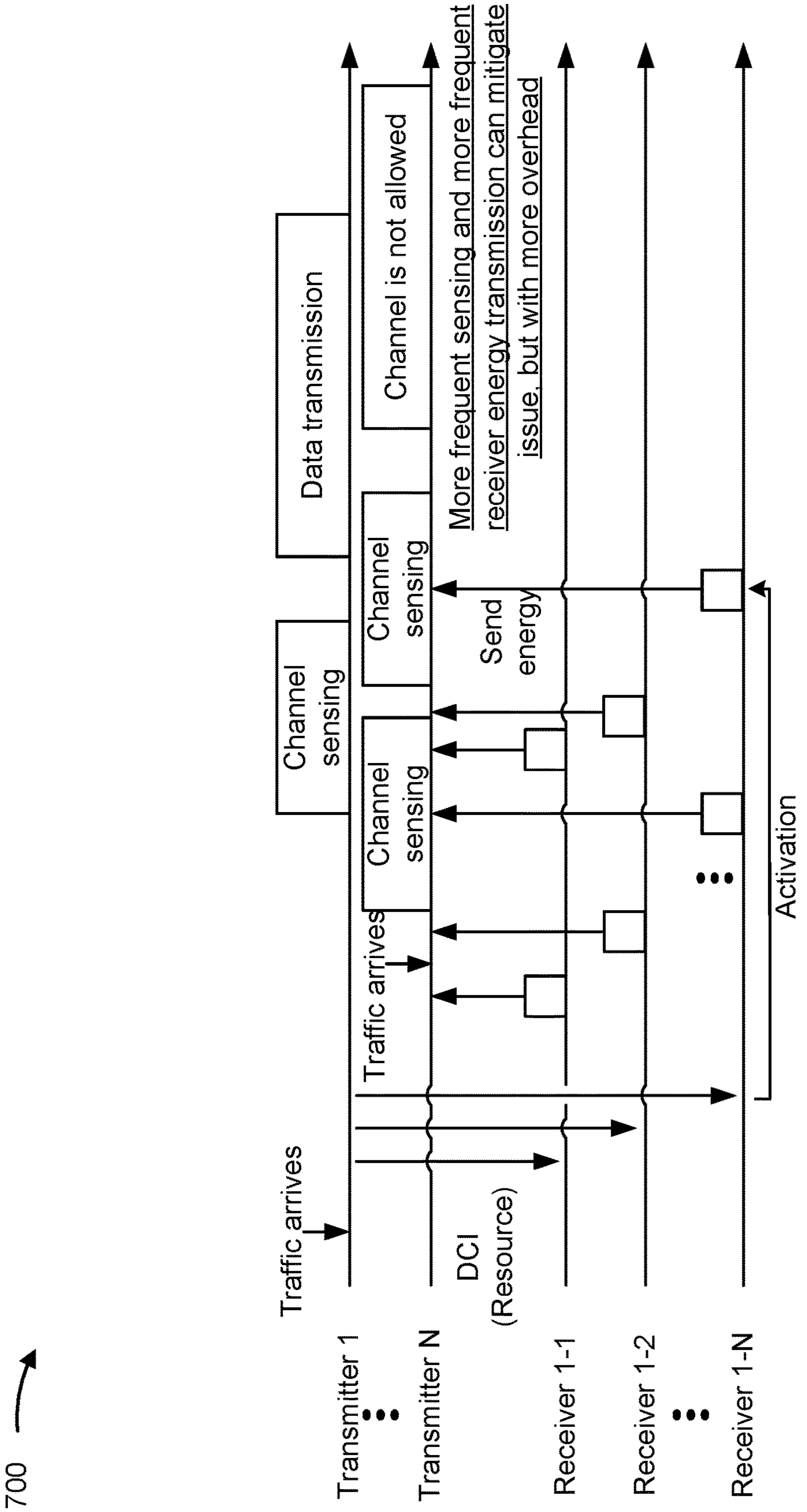

FIG. 7 is a diagram illustrating an example 700 associated with channel sensing for DFS-assisted signals, in accordance with various aspects of the present disclosure.

As shown in FIG. 7, in an asynchronous DFS system, a Transmitter 1 may transmit separate DCIs to a Receiver 1-1, a Receiver 1-2, and a Receiver 1-N. Receiver 1-1, Receiver 1-2, and Receiver 1-N may separately transmit DFS-assisted signals based at least in part on the separate DCIs received from Transmitter 1. The DFS-assisted signals may be sequences or energy detection waveforms. A Transmitter N may receive the DFS-assisted signals while Transmitter N is sensing a channel for DFS-assisted signals. Transmitter N may sense the channel with an increased frequency to increase a likelihood that DFS-assisted signals are detected at Transmitter N. Further, Receiver 1-1, Receiver 1-2, and Receiver 1-N may transmit the DFS-assisted signals at an increased frequency to increase the likelihood that the DFS-assisted signals are detected at Transmitter N. Transmitter N may add one or more channels or beams associated with the DFS-assisted signals to a non-occupancy list. Transmitter N may not perform communications using the one or more channels or beams for a defined duration of time.

As indicated above, FIG. 7 is provided as an example. Other examples may differ from what is described with regard to FIG. 7.

Figure 8:
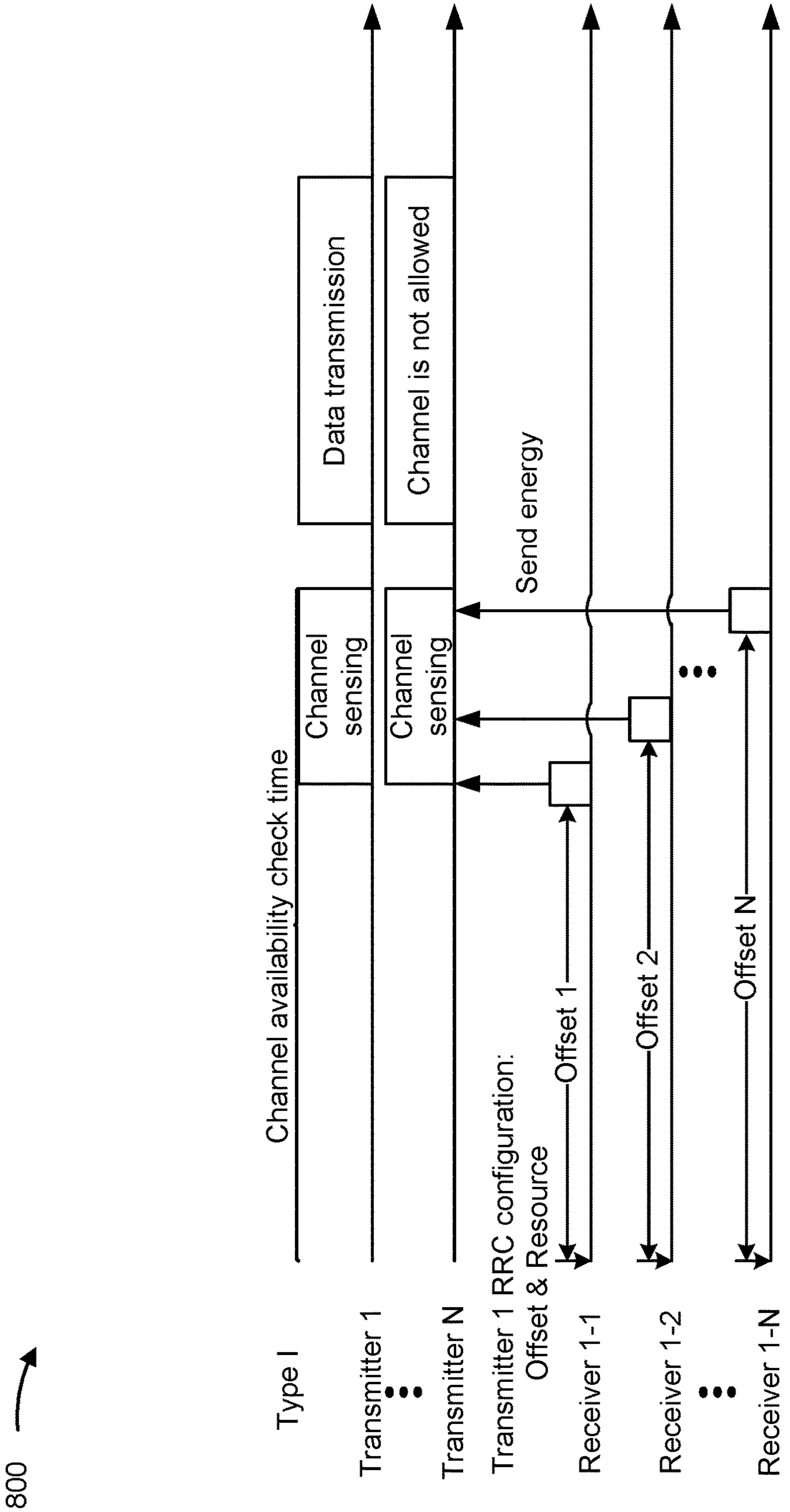

FIG. 8 is a diagram illustrating an example 800 associated with channel sensing for DFS-assisted signals, in accordance with various aspects of the present disclosure.

As shown in FIG. 8, in a synchronous DFS system or an asynchronous DFS system, a Transmitter 1 may transmit separate RRC configurations to a Receiver 1-1, a Receiver 1-2, and a Receiver 1-N. For example, Transmitter 1 may transmit a first RRC configuration to Receiver 1-1 that indicates a first offset and a first resource, Transmitter 1 may transmit a second RRC configuration to Receiver 1-2 that indicates a second offset and a second resource, and Transmitter 1 may transmit a third RRC configuration to Receiver 1-N that indicates a third offset and a third resource. Receiver 1-1, Receiver 1-2, and Receiver 1-N may transmit DFS-assisted signals based at least in part on the separate RRC configurations received from Transmitter 1. For example, Receiver 1-1 may transmit a first DFS-assisted signal based at least in part on the first offset and the first resource, Receiver 1-2 may transmit a second DFS-assisted signal based at least in part on the second offset and the second resource, and Receiver 1-N may transmit a third DFS-assisted signal based at least in part on the third offset and the third resource. Receiver 1-1, Receiver 1-2, and Receiver 1-N may transmit the DFS-assisted signals within a channel availability check time.

As indicated above, FIG. 8 is provided as an example. Other examples may differ from what is described with regard to FIG. 8.

Figure 9:
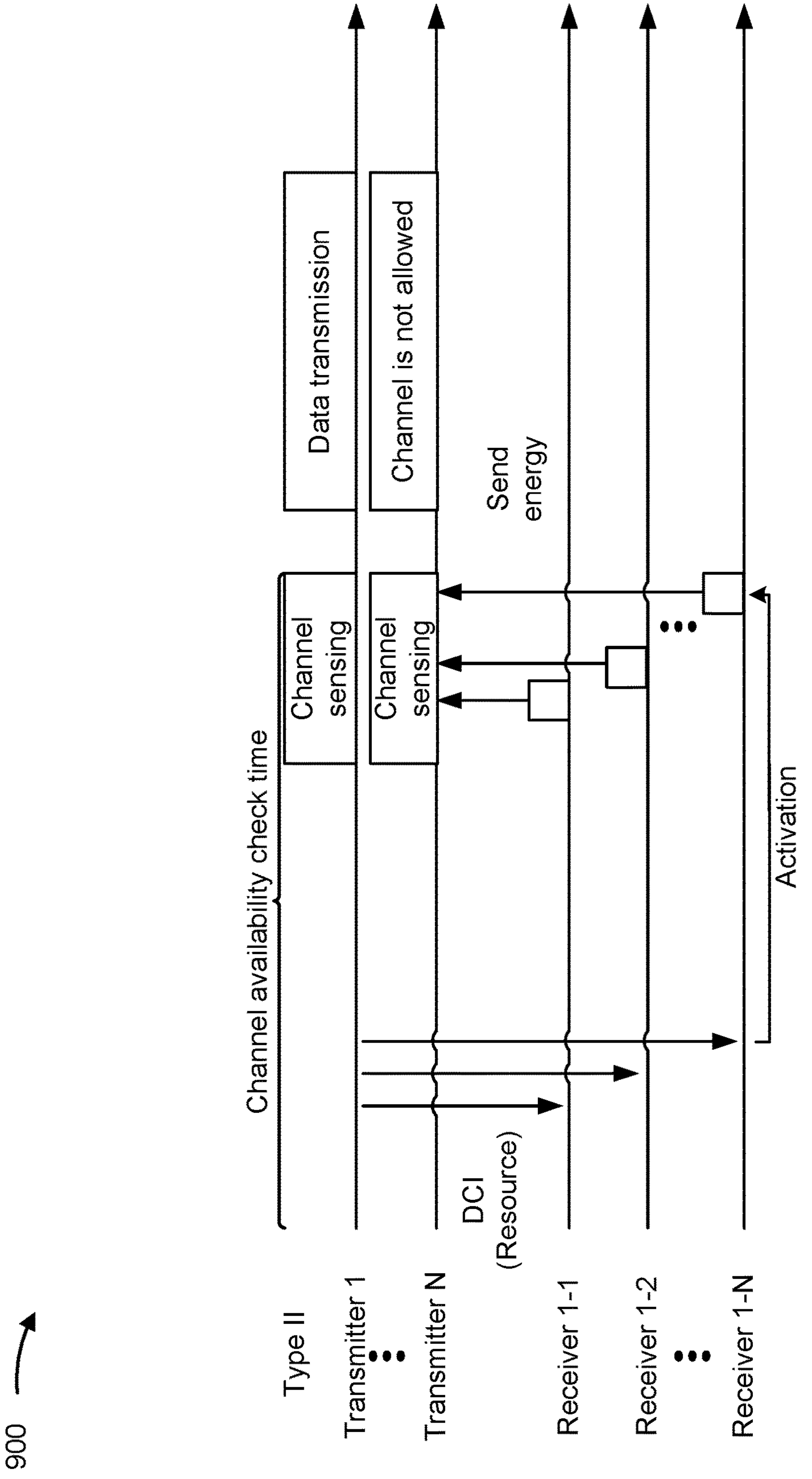

FIG. 9 is a diagram illustrating an example 900 associated with channel sensing for DFS-assisted signals, in accordance with various aspects of the present disclosure.

As shown in FIG. 9, in a synchronous DFS system or an asynchronous DFS system, a Transmitter 1 may transmit separate DCIs to a Receiver 1-1, a Receiver 1-2, and a Receiver 1-N. For example, Transmitter 1 may transmit a first DCI to Receiver 1-1 that indicates a first resource, Transmitter 1 may transmit a second DCI to Receiver 1-2 that indicates a second resource, and Transmitter 1 may transmit a third DCI to Receiver 1-N that indicates a third resource. Receiver 1-1, Receiver 1-2, and Receiver 1-N may transmit DFS-assisted signals based at least in part on the separate DCIs received from Transmitter 1. For example, Receiver 1-1 may transmit a first DFS-assisted signal based at least in part on the first resource, Receiver 1-2 may transmit a second DFS-assisted signal based at least in part on the second resource, and Receiver 1-N may transmit a third DFS-assisted signal based at least in part on the third resource. Receiver 1-1, Receiver 1-2, and Receiver 1-N may transmit the DFS-assisted signals within a channel availability check time.

As indicated above, FIG. 9 is provided as an example. Other examples may differ from what is described with regard to FIG. 9.

Figure 10:
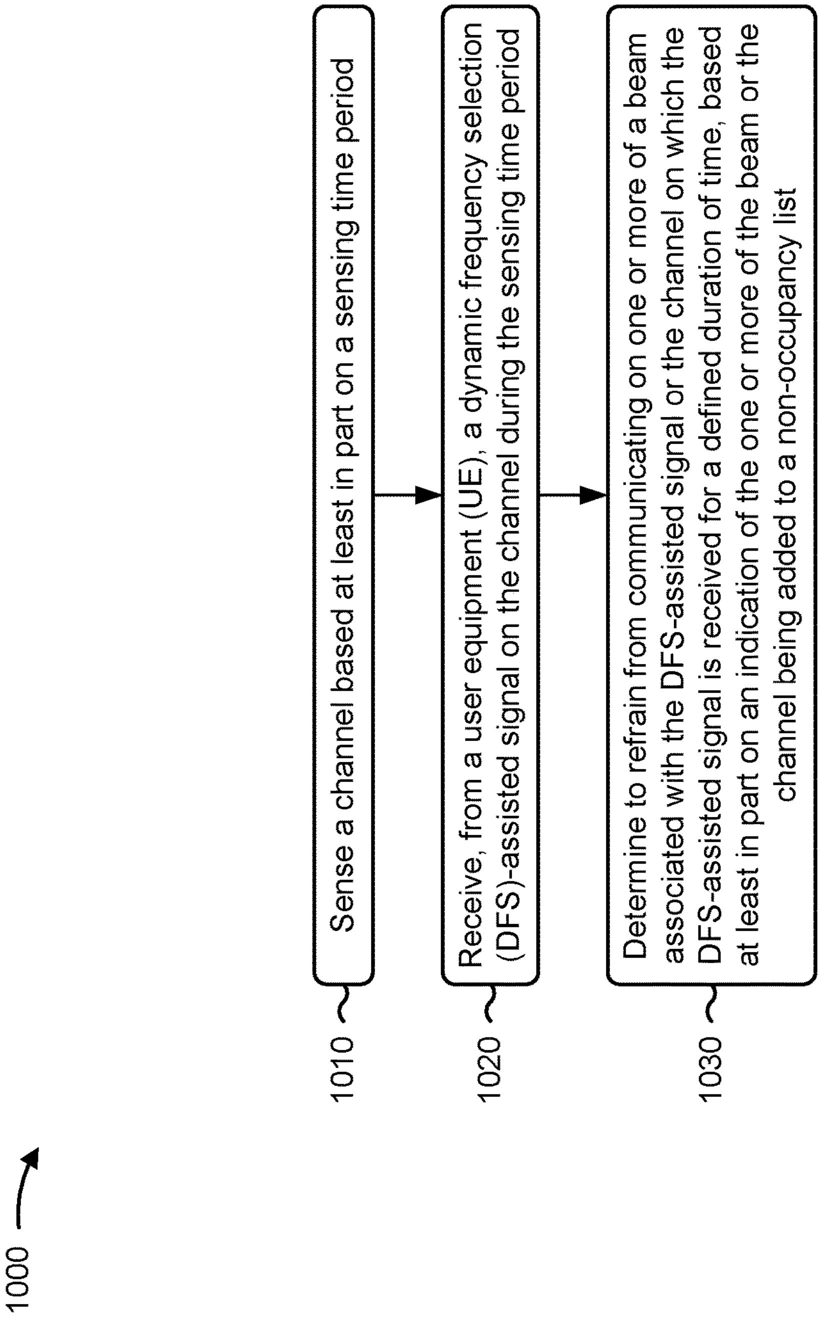
FIG. 10 is a diagram illustrating an example process associated with channel sensing for DFS-assisted signals, in accordance with various aspects of the present disclosure.

FIG. 10 is a diagram illustrating an example process 1000 performed, for example, by a first base station, in accordance with various aspects of the present disclosure. Example process 1000 is an example where the first base station (e.g., first base station 110) performs operations associated with channel sensing for DFS-assisted signals.

As shown in FIG. 10, in some aspects, process 1000 may include sensing a channel based at least in part on a sensing time period (block 1010). For example, the first base station (e.g., using sensing component 1108, depicted in FIG. 11) may sense a channel based at least in part on a sensing time period, as described above.

As further shown in FIG. 10, in some aspects, process 1000 may include receiving, from a UE, a DFS-assisted signal on the channel during the sensing time period (block 1020). For example, the first base station (e.g., using reception component 1102, depicted in FIG. 11) may receive, from a UE, a DFS-assisted signal on the channel during the sensing time period, as described above.

As further shown in FIG. 10, in some aspects, process 1000 may include determining to refrain from communicating on one or more of a beam associated with the DFS-assisted signal or the channel on which the DFS-assisted signal is received for a defined duration of time, based at least in part on an indication of the one or more of the beam or the channel being added to a non-occupancy list (block 1030). For example, the first base station (e.g., using determination component 1110, depicted in FIG. 11) may determine to refrain from communicating on one or more of a beam associated with the DFS-assisted signal or the channel on which the DFS-assisted signal is received for a defined duration of time, based at least in part on an indication of the one or more of the beam or the channel being added to a non-occupancy list, as described above.

Process 1000 may include additional aspects, such as any single aspect or any combination of aspects described below and/or in connection with one or more other processes described elsewhere herein.

In a first aspect, sensing the channel comprises sensing the channel for DFS-assisted signals for the sensing time period based at least in part on a predefined channel sensing pattern.

In a second aspect, alone or in combination with the first aspect, process 1000 includes receiving an indication of the predefined channel sensing pattern from a second base station that is neighboring the first base station.

In a third aspect, alone or in combination with one or more of the first and second aspects, process 1000 includes determining to not sense the channel outside the sensing time period based at least in part on the predefined channel sensing pattern.

In a fourth aspect, alone or in combination with one or more of the first through third aspects, the predefined channel sensing pattern defines a pattern and a periodicity for channel sensing of DFS-assisted signals.

In a fifth aspect, alone or in combination with one or more of the first through fourth aspects, sensing the channel comprises sensing the channel for DFS-assisted signals for the sensing time period based at least in part on an asynchronous DFS channel sensing mechanism that is specific to the first base station, wherein increasing a frequency of channel sensing and a frequency of DFS-assisted signal transmissions increases a sensing accuracy and increases a signaling overhead.

In a sixth aspect, alone or in combination with one or more of the first through fifth aspects, sensing the channel comprises sensing the channel for DFS-assisted signals for the sensing time period based at least in part on traffic that is received at the first base station.

In a seventh aspect, alone or in combination with one or more of the first through sixth aspects, the DFS-assisted signal is associated with a sequence.

In an eighth aspect, alone or in combination with one or more of the first through seventh aspects, the sequence is based at least in part on a cell identifier.

In a ninth aspect, alone or in combination with one or more of the first through eighth aspects, the DFS-assisted signal is associated with a waveform to assist with energy detection.

In a tenth aspect, alone or in combination with one or more of the first through ninth aspects, the DFS-assisted signal is received from the UE during the sensing time period based at least in part on a configured time duration received at the UE from a second base station.

In an eleventh aspect, alone or in combination with one or more of the first through tenth aspects, the configured time duration is on a per-beam basis or a per-beam-group basis.

In a twelfth aspect, alone or in combination with one or more of the first through eleventh aspects, receiving the DFS-assisted signal comprises receiving the DFS-assisted signal from the UE based at least in part on an RRC configuration received at the UE from a second base station, wherein the RRC configuration indicates an offset associated with a transmission of the DFS-assisted signal and a resource associated with the DFS-assisted signal.

In a thirteenth aspect, alone or in combination with one or more of the first through twelfth aspects, receiving the DFS-assisted signal comprises receiving the DFS-assisted signal from the UE based at least in part on DCI received at the UE from a second base station, wherein the DCI indicates a resource associated with the DFS-assisted signal.

In a fourteenth aspect, alone or in combination with one or more of the first through thirteenth aspects, receiving the DFS-assisted signal comprises receiving the DFS-assisted signal from the UE based at least in part on one or more of scheduling information or interference information associated with the UE, and transmissions of DFS-assisted signals are configured to be skipped at the UE to control a signaling overhead associated with the UE and a transmit power of the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
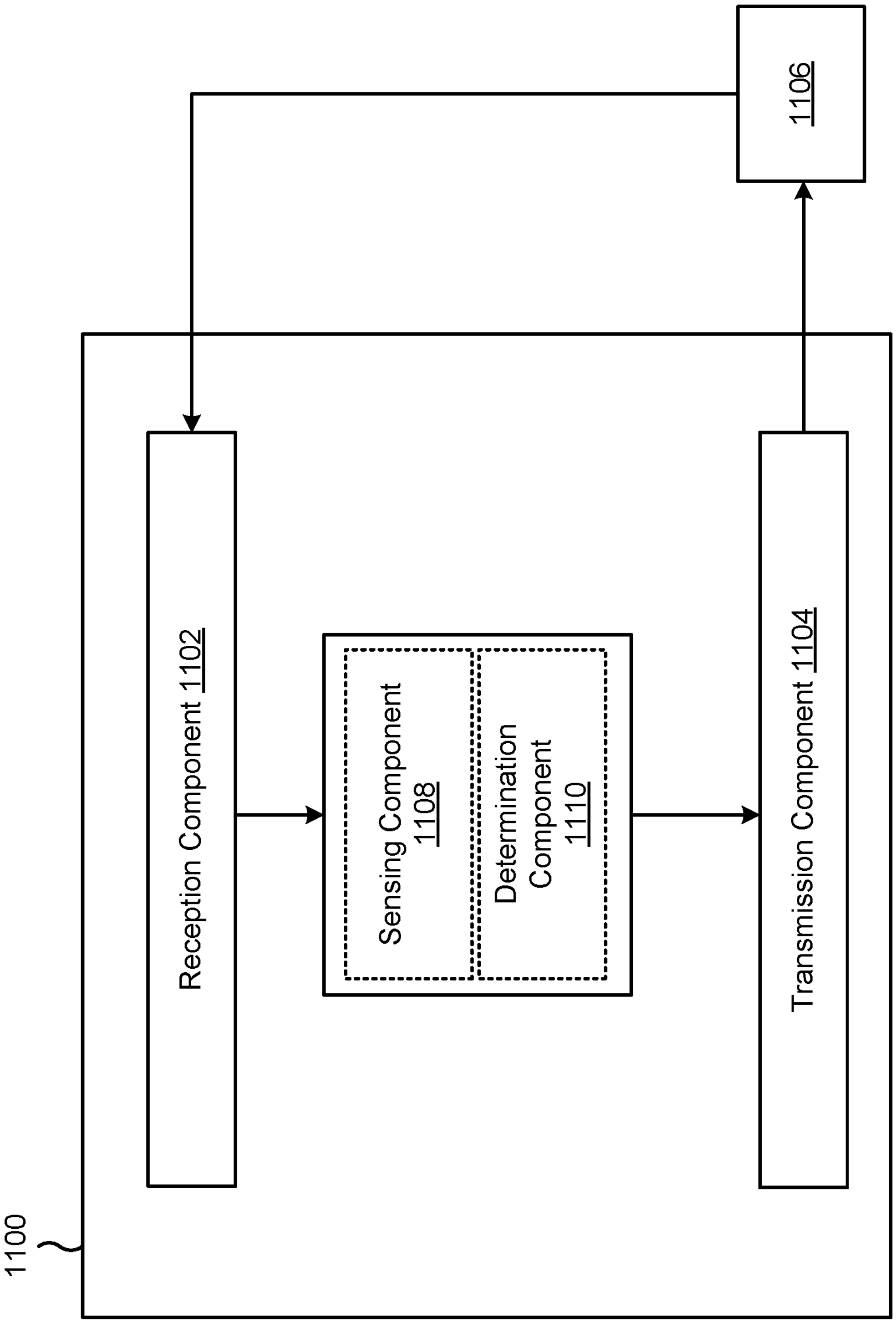
FIG. 11 is a block diagram of an example apparatus for wireless communication, in accordance with various aspects of the present disclosure.

FIG. 11 is a block diagram of an example apparatus 1100 for wireless communication. The apparatus 1100 may be a first base station, or a first base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a sensing component 1108, or a determination component 1110, among other examples.

In some aspects, the apparatus 1100 may be configured to perform one or more operations described herein in connection with FIGS. 4-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the first base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the first base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first base station described above in connection with FIG. 2. In some aspects, the transmission component 1104 may be co-located with the reception component 1102 in a transceiver.

The sensing component 1108 may sense a channel based at least in part on a sensing time period. The reception component 1102 may receive, from a UE, a DFS-assisted signal on the channel during the sensing time period. The determination component 1110 may determine to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

The reception component 1102 may receive an indication of the predefined channel sensing pattern from a second base station that is neighboring the first base station. The determination component 1110 may determine to not sense the channel outside the sensing time period based at least in part on the predefined channel sensing pattern.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a first base station, comprising: sensing a channel based at least in part on a sensing time period; receiving, from a user equipment (UE), a dynamic frequency selection (DFS)-assisted signal on the channel during the sensing time period; and determining to refrain from communicating on one or more of a beam associated with the DFS-assisted signal or the channel on which the DFS-assisted signal is received for a defined duration of time, based at least in part on an indication of the one or more of the beam or the channel being added to a non-occupancy list.

Aspect 2: The method of aspect 1, wherein sensing the channel comprises sensing the channel for DFS-assisted signals for the sensing time period based at least in part on a predefined channel sensing pattern.

Aspect 3: The method of any of aspects 1 through 2, further comprising: receiving an indication of the predefined channel sensing pattern from a second base station that is neighboring the first base station.

Aspect 4: The method of any of aspects 1 through 3, further comprising: determining to not sense the channel outside the sensing time period based at least in part on the predefined channel sensing pattern.

Aspect 5: The method of any of aspects 1 through 4, wherein the predefined channel sensing pattern defines a pattern and a periodicity for channel sensing of DFS-assisted signals.

Aspect 6: The method of any of aspects 1 through 5, wherein sensing the channel comprises sensing the channel for DFS-assisted signals for the sensing time period based at least in part on an asynchronous DFS channel sensing mechanism that is specific to the first base station, wherein increasing a frequency of channel sensing and a frequency of DFS-assisted signal transmissions increases a sensing accuracy and increases a signaling overhead.

Aspect 7: The method of any of aspects 1 through 6, wherein sensing the channel comprises sensing the channel for DFS-assisted signals for the sensing time period based at least in part on traffic that is received at the first base station.

Aspect 8: The method of any of aspects 1 through 7, wherein the DFS-assisted signal is associated with a sequence.

Aspect 9: The method of any of aspects 1 through 8, wherein the sequence is based at least in part on a cell identifier.

Aspect 10: The method of any of aspects 1 through 9, wherein the DFS-assisted signal is associated with a waveform to assist with energy detection.

Aspect 11: The method of any of aspects 1 through 10, wherein the DFS-assisted signal is received from the UE during the sensing time period based at least in part on a configured time duration received at the UE from a second base station.

Aspect 12: The method of any of aspects 1 through 11, wherein the configured time duration is on a per-beam basis or a per-beam-group basis.

Aspect 13: The method of any of aspects 1 through 12, wherein receiving the DFS-assisted signal comprises receiving the DFS-assisted signal from the UE based at least in part on a radio resource control (RRC) configuration received at the UE from a second base station, wherein the RRC configuration indicates an offset associated with a transmission of the DFS-assisted signal and a resource associated with the DFS-assisted signal.

Aspect 14: The method of any of aspects 1 through 13, wherein receiving the DFS-assisted signal comprises receiving the DFS-assisted signal from the UE based at least in part on downlink control information (DCI) received at the UE from a second base station, wherein the DCI indicates a resource associated with the DFS-assisted signal.

Aspect 15: The method of any of aspects 1 through 14, wherein receiving the DFS-assisted signal comprises receiving the DFS-assisted signal from the UE based at least in part on one or more of scheduling information or interference information associated with the UE, and wherein transmissions of DFS-assisted signals are configured to be skipped at the UE to control a signaling overhead associated with the UE and a transmit power of the UE.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first base station for wireless communication, comprising:

a memory; and one or more processors operatively coupled to the memory, the one or more processors configured to:

receive an indication of a channel sensing pattern from a second base station;

sense a channel in a millimeter wave (mmWave) system in accordance with the channel sensing pattern and based at least in part on a sensing time period;

receive, from a user equipment (UE) in the mmWave system and in accordance with sensing of the channel, a dynamic frequency selection (DFS)-assisted signal in accordance with the channel sensing pattern and on the channel during the sensing time period; and suspend communications on one or more of a beam associated with the DFS-assisted signal or the channel on which the DFS-assisted signal is received for a defined duration of time, based at least in part on an indication of the one or more of the beam or the channel being added to a non-occupancy list.

2. The first base station of claim 1, wherein the channel sensing pattern comprises a predefined channel sensing pattern.

3. The first base station of claim 1, wherein the second base station is neighboring the first base station.

4. The first base station of claim 1, wherein:

the first base station is associated with a first cell, the second base station is associated with a second cell, and the first cell is within a threshold distance of the second cell.

5. The first base station of claim 1, wherein the one or more processors are further configured to:

determine to not sense the channel outside the sensing time period based at least in part on the channel sensing pattern.

6. The first base station of claim 1, wherein the channel sensing pattern defines a pattern and a periodicity for channel sensing of DFS-assisted signals.

7. The first base station of claim 1, wherein the one or more processors, when sensing the channel, are configured to sense the channel for DFS-assisted signals for the sensing time period based at least in part on an asynchronous DFS channel sensing mechanism that is specific to the first base station, wherein increasing a frequency of channel sensing and a frequency of DFS-assisted signal transmissions increases a sensing accuracy and increases a signaling overhead.

8. The first base station of claim 1, wherein the one or more processors, when sensing the channel, are configured to sense the channel for DFS-assisted signals for the sensing time period based at least in part on traffic that is received at the first base station.

9. The first base station of claim 1, wherein the DFS-assisted signal is associated with a sequence.

10. The first base station of claim 9, wherein the sequence is based at least in part on a cell identifier.

11. The first base station of claim 1, wherein the DFS-assisted signal is associated with a waveform to assist with energy detection.

12. The first base station of claim 1, wherein the DFS-assisted signal is received from the UE during the sensing time period based at least in part on a configured time duration received at the UE from the second base station.

13. The first base station of claim 12, wherein the configured time duration is on a per-beam basis or a per-beam-group basis.

14. The first base station of claim 1, wherein receiving the DFS-assisted signal comprises receiving the DFS-assisted signal from the UE based at least in part on a radio resource control (RRC) configuration received at the UE from the second base station, wherein the RRC configuration indicates an offset associated with a transmission of the DFS-assisted signal and a resource associated with the DFS-assisted signal.

15. The first base station of claim 1, wherein receiving the DFS-assisted signal comprises receiving the DFS-assisted signal from the UE based at least in part on downlink control information (DCI) received at the UE from the second base station, wherein the DCI indicates a resource associated with the DFS-assisted signal.

16. The first base station of claim 1, wherein the one or more processors, when receiving the DFS-assisted signal, are configured to receive the DFS-assisted signal from the UE based at least in part on one or more of scheduling information or interference information associated with the UE, and wherein transmissions of DFS-assisted signals are configured to be skipped at the UE to control a signaling overhead associated with the UE and a transmit power of the UE.

17. The first base station of claim 1, wherein the DFS-assisted signal comprises a single frequency network (SFN)-based transmission.

18. A method of wireless communication performed by a first base station, comprising:

receiving an indication of a channel sensing pattern from a second base station;

sensing a channel in a millimeter wave (mmWave) system in accordance with the channel sensing pattern and based at least in part on a sensing time period;

receiving, from a user equipment (UE) in the mmWave system and in accordance with sensing the channel, a dynamic frequency selection (DFS)-assisted signal in accordance with the channel sensing pattern and on the channel during the sensing time period; and suspending communications on one or more of a beam associated with the DFS-assisted signal or the channel on which the DFS-assisted signal is received for a defined duration of time, based at least in part on an indication of the one or more of the beam or the channel being added to a non-occupancy list.

19. The method of claim 18, wherein the channel sensing pattern comprises a predefined channel sensing pattern.

20. The method of claim 18, wherein the second base station is neighboring the first base station.

21. The method of claim 18, further comprising: determining to not sense the channel outside the sensing time period based at least in part on the channel sensing pattern.

22. The method of claim 18, wherein the channel sensing pattern defines a pattern and a periodicity for channel sensing of DFS-assisted signals.

23. The method of claim 18, wherein sensing the channel comprises sensing the channel for DFS-assisted signals for the sensing time period based at least in part on an asynchronous DFS channel sensing mechanism that is specific to the first base station, wherein increasing a frequency of channel sensing and a frequency of DFS-assisted signal transmissions increases a sensing accuracy and increases a signaling overhead.

24. The method of claim 18, wherein sensing the channel comprises sensing the channel for DFS-assisted signals for the sensing time period based at least in part on traffic that is received at the first base station.

25. The method of claim 18, wherein the DFS-assisted signal is associated with a sequence.

26. The method of claim 25, wherein the sequence is based at least in part on a cell identifier.

27. The method of claim 18, wherein the DFS-assisted signal is associated with a waveform to assist with energy detection.

28. The method of claim 16, wherein the DFS-assisted signal is received from the UE during the sensing time period based at least in part on a configured time duration received at the UE from the second base station.

29. The method of claim 28, wherein the configured time duration is on a per-beam basis or a per-beam-group basis.

30. The method of claim 18, wherein receiving the DFS-assisted signal comprises receiving the DFS-assisted signal from the UE based at least in part on a radio resource control (RRC) configuration received at the UE from the second base station, wherein the RRC configuration indicates an offset associated with a transmission of the DFS-assisted signal and a resource associated with the DFS-assisted signal.

31. The method of claim 18, wherein receiving the DFS-assisted signal comprises receiving the DFS-assisted signal from the UE based at least in part on downlink control information (DCI) received at the UE from the second base station, wherein the DCI indicates a resource associated with the DFS-assisted signal.

32. The method of claim 18, wherein receiving the DFS-assisted signal comprises receiving the DFS-assisted signal from the UE based at least in part on one or more of scheduling information or interference information associated with the UE, and wherein transmissions of DFS-assisted signals are configured to be skipped at the UE to control a signaling overhead associated with the UE and a transmit power of the UE.

33. A non-transitory computer-readable medium storing a set of instructions for wireless communication, the set of instructions comprising:

one or more instructions that, when executed by one or more processors of a first base station, cause the first base station to:

receive an indication of a channel sensing pattern from a second base station;

sense a channel in a millimeter wave (mmWave) system in accordance with the channel sensing pattern and based at least in part on a sensing time period;

receive, from a user equipment (UE) in the mmWave system and in accordance with sensing of the channel, a dynamic frequency selection (DFS)-assisted signal in accordance with the channel sensing pattern and on the channel during the sensing time period; and suspend communications on one or more of a beam associated with the DFS-assisted signal or the channel on which the DFS-assisted signal is received for a defined duration of time, based at least in part on an indication of the one or more of the beam or the channel being added to a non-occupancy list.

* * * * *